US011981127B2

(12) United States Patent
Yoshigai

(10) Patent No.: US 11,981,127 B2
(45) Date of Patent: May 14, 2024

(54) LIQUID DISCHARGE APPARATUS, LIQUID DISCHARGE METHOD, AND NON-TRANSITORY RECORDING MEDIUM

(71) Applicant: Shigeru Yoshigai, Kanagawa (JP)

(72) Inventor: Shigeru Yoshigai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 179 days.

(21) Appl. No.: 17/583,455

(22) Filed: Jan. 25, 2022

(65) Prior Publication Data

US 2022/0274396 A1 Sep. 1, 2022

(30) Foreign Application Priority Data

Feb. 26, 2021 (JP) ................................. 2021-031174

(51) Int. Cl.
*B41J 2/045* (2006.01)
*B41J 2/175* (2006.01)

(52) U.S. Cl.
CPC ....... *B41J 2/04501* (2013.01); *B41J 2/17503* (2013.01)

(58) Field of Classification Search
CPC .. B41J 2/04501; B41J 2/17503; B41J 2/1752; B41J 2/20; B41J 29/38; B41J 2/0451; B41J 2/04513; B41J 2/04526; B41J 2/125; B41J 2/04566; B41J 2/04508
See application file for complete search history.

(56) References Cited

U.S. PATENT DOCUMENTS

2008/0225070 A1 9/2008 Morishita et al.
2009/0028586 A1 1/2009 Yamashiro et al.
2009/0237744 A1 9/2009 Ogura et al.
2016/0067989 A1 3/2016 Yoshigai et al.
2016/0082753 A1 3/2016 Sasaki et al.
2017/0015112 A1 1/2017 Yoshigai
2019/0289161 A1 9/2019 Yoshigai

FOREIGN PATENT DOCUMENTS

JP 2010-240942 10/2010

*Primary Examiner* — Kristal Feggins
(74) *Attorney, Agent, or Firm* — IPUSA, PLLC

(57) ABSTRACT

A liquid discharge apparatus includes a liquid discharge head configured to discharge a liquid, a liquid cartridge configured to store the liquid to be discharged from the liquid discharge head, a holder to which the liquid cartridge is detachably attachable, a timer configured to countdown a time, and circuitry configured to control the liquid discharge head to discharge the liquid as a discharge operation, control the liquid discharge head to stop the discharge operation, determine an attachment or a detachment of the liquid cartridge to or from the holder while the discharge operation is stopped, control the timer to prepare countdown of the time in response to a detachment of the liquid cartridge from the holder, and control the liquid discharge head to continue stopping the discharge operation in response to an attachment of the liquid cartridge to the holder before the time has reached zero.

7 Claims, 15 Drawing Sheets

LIQUID DISCHARGE APPARATUS, LIQUID DISCHARGE METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2021-031174, filed on Feb. 26, 2021, in the Japan Patent Office, the entire disclosure of which is hereby incorporated by reference herein.

BACKGROUND

Technical Field

Embodiments of the present disclosure relate to a liquid discharge apparatus, a liquid discharge method, and a non-transitory recording medium storing a plurality of instructions to control the liquid discharge apparatus.

Related Art

A liquid discharge apparatus includes a liquid discharge head that discharges a liquid. The liquid discharge apparatus may serve as an image forming apparatus that discharges a liquid onto a medium to form an image. The liquid discharge apparatus may include a liquid cartridge that stores liquid to be supplied to the liquid discharge head. The liquid cartridge is detachably attached to the liquid discharge apparatus.

Liquids contain various content components of various colors used for forming an image. Some of the content components in the liquid may easily precipitate during the liquid is stored in the liquid cartridge. When a certain period of time has elapsed in a state in which the liquid cartridge is attached to the liquid discharge apparatus, a precipitation of a part of the content component of the liquid (ink) progresses in the liquid cartridge.

The precipitation of the content component may cause a delivery failure of the liquid from the liquid cartridge to the liquid discharge head and may cause malfunction in a discharge operation of the liquid discharge head. When the liquid discharge operation of the liquid discharge head is executed in a state in which the precipitation of the content component of the liquid in the liquid cartridge is left as it is, the precipitation may cause variations in discharge amount, unevenness in color density when the ink is attached to a medium.

For example, white liquid ink is an example in which an ink component is easily precipitated. Thus, the white ink easily causes a density unevenness when an image is formed using the white ink. The liquid discharge apparatus notifies an operator of an instruction to periodically perform a stirring operation on the liquid cartridge containing white ink to prevent occurrence of density unevenness of an image due to precipitation of color components.

SUMMARY

In an aspect of this disclosure, a liquid discharge apparatus includes a liquid discharge head configured to discharge a liquid, a liquid cartridge configured to store the liquid to be discharged from the liquid discharge head, a holder to which the liquid cartridge is detachably attachable, a timer configured to countdown a time, and circuitry configured to control the liquid discharge head to discharge the liquid as a discharge operation, control the liquid discharge head to stop the discharge operation, determine an attachment or a detachment of the liquid cartridge to or from the holder while the discharge operation is stopped, control the timer to prepare countdown of the time in response to a detachment of the liquid cartridge from the holder, and control the liquid discharge head to continue stopping the discharge operation in response to an attachment of the liquid cartridge to the holder before the time has reached zero.

In another aspect of this disclosure, a liquid discharge apparatus includes a liquid discharge head configured to discharge a liquid, a liquid cartridge configured to store the liquid to be discharged from the liquid discharge head, a holder to which the liquid cartridge is detachably attachable, a display configured to display an operation to be performed, a timer configured to count a time, and circuitry configured to determine an attachment or a detachment of the liquid cartridge to or from the holder, control the timer to start counting the time in response to a detachment of the liquid cartridge from the holder, control the display to display the time counted by the timer, and control the timer to stop counting the time in response to an attachment of the liquid cartridge to the holder before the time has reached a preset threshold time.

In still another aspect of this disclosure, a liquid discharge method, includes controlling a liquid discharge head to discharge a liquid as a discharge operation, controlling the liquid discharge head to stop the discharge operation, determining an attachment or a detachment of a liquid cartridge to or from a holder while the discharge operation is stopped, controlling a timer to prepare countdown of a time in response to a detachment of the liquid cartridge from the holder; and controlling the liquid discharge head to continue stopping the discharge operation in response to an attachment of the liquid cartridge to the holder before the time has reached zero.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
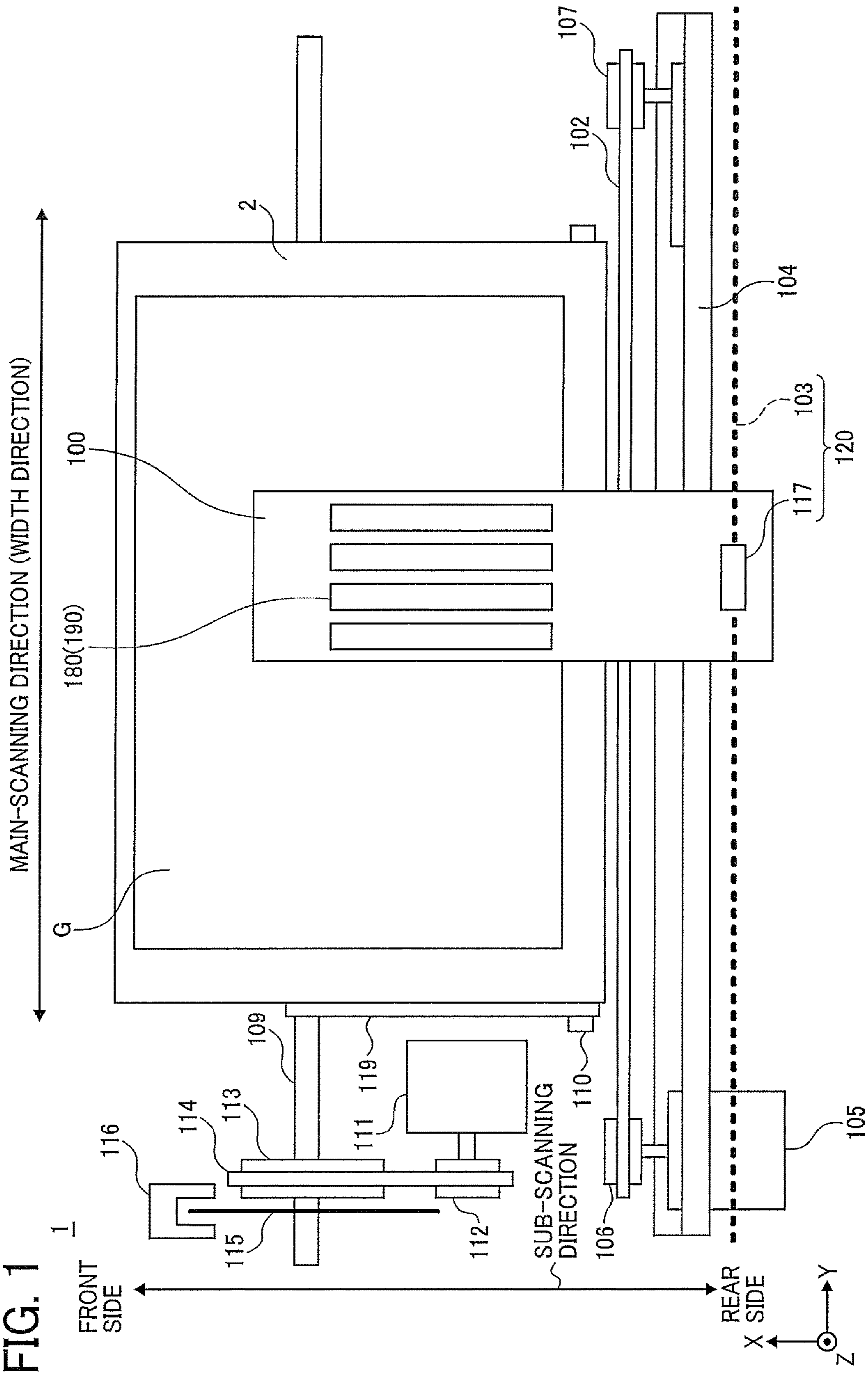
FIG. 1 is a schematic plan view of a printer as an image forming apparatus according to a first embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a", "an", and "the" are intended to include the plural forms as well, unless the context clearly indicates otherwise.

[Overview of Liquid Discharge Apparatus]

Hereinafter, embodiments of the present disclosure is described below with reference to the drawings. FIG. 1 is a top view of a printer 1 as a liquid discharge apparatus according to a first embodiment of present disclosure. The printer 1 is, for example, an inkjet-type image forming apparatus that forms an image on a fabric (garment) by discharging ink. A technical scope of the present embodiment is not limited to this embodiment (the printer 1 for a fabric). The liquid discharge apparatus (printer 1) according to the present embodiment may also include other embodiments such as a multifunction peripheral and an image forming apparatus to form an image on paper other than a fabric.

FIG. 1 mainly illustrates an image forming part of the printer 1. The image forming part of the printer 1 holds a carriage 100 as a holder with a slide rail 104 formed together with a sheet metal. The image forming part of the printer 1 includes a main-scanning motor 105 that moves and scans the carriage 100 in a main-scanning direction via a timing belt 102 bridged between a drive pulley 106 and a driven pulley 107. The main-scanning direction is indicated by arrow in FIG. 1.

The carriage 100 serves as a holder. The carriage 100 mounts (holds) heads 180 that respectively discharge liquid inks of colors of, for example, black (BK), cyan (C), magenta (M), and yellow (Y) as liquid droplets. Hereinafter, the "head" is simply referred to as a "head". Each head 180 includes a nozzle surface in which multiple ink discharge ports (nozzles) are arranged in a sub-scanning direction orthogonal to the main-scanning direction. Hereinafter, the "ink discharge port" is simply referred to as a "nozzle". The heads 180 may be respectively formed together with liquid cartridges 190 that store the liquid inks to respectively supply the liquid inks to the heads 180.

When the heads 180 are attached to the carriage 100, the head 180 are held by the carriage 100 such that the nozzle surface of each head 180 faces downward in an ink discharge direction. Thus, the printer 1 can perform a liquid discharge operation while moving (scanning) the carriage 100 in the main-scanning direction to move the nozzle surfaces (multiple ink discharge ports) of the heads 180 in the main-scanning direction.

The printer 1 according to the first embodiment includes a controller 200 (circuitry). When the head 180 is detached from the carriage 100, the controller 200 identifies that the liquid cartridge 190 is not attached to the carriage 100 by a cartridge attachment detection circuit 541 described below. When the head 180 is attached to the carriage 100, the controller 200 identifies that the liquid cartridge 190 is attached to the printer 1 (carriage 100). That is, the carriage 100 includes a configuration to output, to the controller 200, an attachment state information as information capable of identifying whether the head 180 is attached to or detached from the carriage 100.

Details of a configuration of the carriage 100 to output the attachment state information and a configuration of the controller 200 that identifies and controls the attachment state information are described below.

In FIG. 1, the heads 180, which are distinguished for each color of liquid ink, are independently attached to the carriage 100. However, each head 180 may include multiple nozzle arrays to discharge different colors of the liquid inks. A number of colors and an arrangement order of the heads 180 are not limited to the number and the arrangement order as described above.

As a configuration different from the configuration illustrated in FIG. 1, the liquid cartridge 190 may be provided separately from the head 180. In the above case in which the head 180 is separated from the liquid cartridge 190, the printer 1 may include a liquid pump to supply the liquid ink to the head 180. In the above case in which the head 180 is separated from the liquid cartridge 190, the printer may include a cartridge holder to hold the liquid cartridge 190. The cartridge holder serves the holder.

Then, the cartridge holder may include a configuration to output the attachment state information indicating an attachment or a detachment of the liquid cartridge 190 to or from the cartridge holder to the controller 200. In this case, the liquid cartridges 190 are independently attachable to and detachable from the cartridge holder in the printer 1. The liquid cartridges 190 individually store the liquid inks of the respective colors. Therefore, when the liquid cartridge 190 is detached from the cartridge holder, a detection signal as the attachment state information may be notified to the controller 200 from the cartridge attachment detection circuit 541 in the cartridge holder. Details of the cartridge attachment detection circuit 541 is described below.

As the inkjet head that forms the head 180, it may be used an inkjet head including a piezoelectric actuator such as a piezoelectric element as a pressure generator to generate a pressure to discharge liquid droplets. The inkjet head may include the pressure generator using a thermal actuator. The thermal actuator is an actuator using a phase change due to film boiling of a liquid using an electrothermal conversion element such as a heating resistor. The pressure generator generates the pressure to discharge liquid droplets. Similarly, the inkjet head may include the pressure generator using a shape-memory alloy actuator using metallic-phase change due to temperature change, an electrostatic actuator using electrostatic force, or the like.

Further, the carriage 100 include an encoder scale 103 having slits formed in the encoder scale 103 and an encoder sensor 117 to detect the slits in the encoder scale 103. The encoder scale 103 is arranged along the main-scanning direction. As illustrated in FIG. 1, the encoder scale 103 and the encoder sensor 117 configure a linear encoder 120 that detects a position of the carriage 100 in the main-scanning direction.

The printer 1 includes a platen 2 at a position facing the head 180. The platen 2 serves as a conveyor to convey a fabric G (Garment) as a medium onto which a liquid is discharged.

The printer 1 includes a sub-scanning motor 111 to rotationally drives a conveyance roller 109 via a timing belt 114 bridged between a conveyance drive pulley 112 and a conveyance roller pulley 113 to drive the platen 2.

The platen 2 includes an encoder wheel 115 that is coaxial with the conveyance roller 109. The encoder wheel 115 has slits formed in the encoder wheel 115. The printer 1 includes an encoder sensor 116 to detect the slits in the encoder wheel 115 on a side plate. The encoder wheel 115 and the encoder sensor 116 configured a wheel encoder to detect a position of the platen 2 in the sub-scanning direction.

The platen 2 is of a flatbed type. The platen 2 is conveyed horizontally in the sub-scanning direction via a timing belt 119 (conveyance belt) bridged between the conveyance roller 109 and a tension roller 110.

Figure 2:
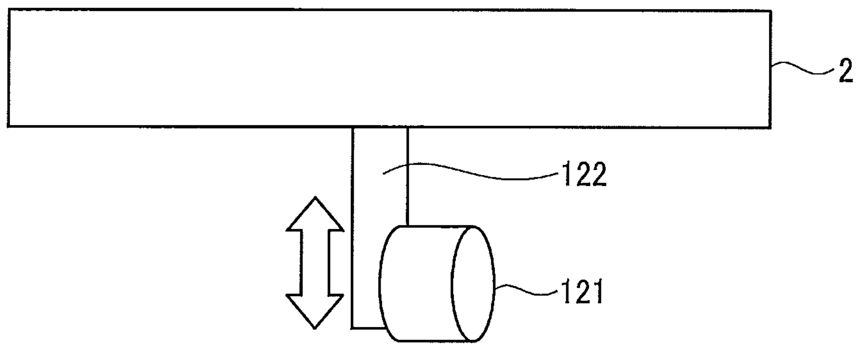
FIG. 2 is a schematic side view of a configuration of an elevation mechanism of a platen according to the first embodiment of the present disclosure.

FIG. 2 is a schematic side view of a configuration of an elevation mechanism of the platen 2. As illustrated in FIG. 2, the printer 1 includes a platen elevation motor 121 as a stepping motor to raise or lower the platen 2 via a gear 122.

[Embodiment of Control Configuration]

Figure 3:
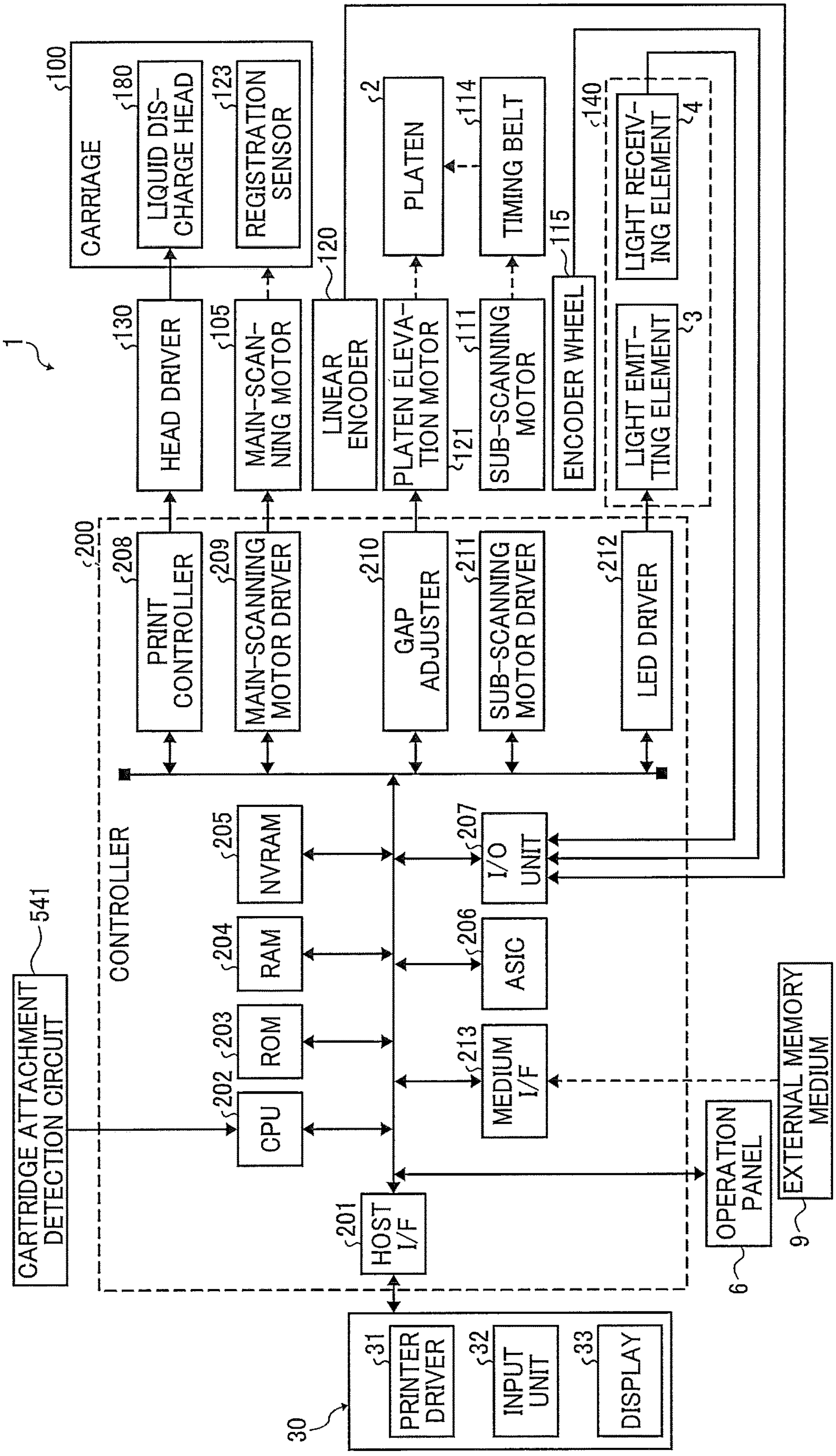
FIG. 3 is a schematic block diagram illustrating a controller in the printer according to the first embodiment.

FIG. 3 is a schematic block diagram illustrating the controller 200 in the printer 1 according to the first embodiment and a functional configuration of an object to be controlled. The object to be controlled by the controller 200 is coupled to the controller 200. The controller 200 illustrated in FIG. 3 includes a central processing unit 202 (CPU 202), a read only memory 203 (ROM 203), a random-access memory 204 (RAM 204), a non-volatile random-access memory 205 (NVRAM 205), and an application specific integrated circuit 206 (ASIC 206).

The CPU 202 is coupled to an operation panel 6 as a display to input and display information for the apparatus, and the CPU 202 controls the entire apparatus. In addition, the CPU 202 has a function of controlling the conveyance operation of the fabric C and a moving operation of the head 180 on the carriage 100. The ROM 203 stores various programs executed by the CPU 202 and other fixed data. The RAM 204 temporarily stores image data and other data. The NVRAM 205 is a nonvolatile rewritable memory to hold data even while the power supply of the device is shut off. The ASIC 206 performs image processing, such as various signal processing and sorting, on image data and process input and output signals to control entire of the printer 1.

The controller 200 as a control apparatus further includes a host interface 201 (host I/F 201), a print controller 208, a main-scanning motor driver 209, a gap adjuster 210, a sub-scanning motor driver 211, a light emitting diode driver 212 (LED driver 212), an input output unit 207 (I/O unit 207), and a medium interface 213 (medium I/F 213). The host I/F 201 serves to transmit and receive data and signals to and from a host device 30 such as the printer driver 31.

The print controller 208 generates a drive waveform to drive the heads 180 and outputs, to the head driver 130, the image data to selectively drive a pressure generator of the head 180 and various types of data relating to the image data. The host device 30 includes the printer driver 31, an input unit 32, and a display 33. The input unit 32 enable the operator to input data to the host device 30. The display 33 displays information output from the controller 200.

The main-scanning motor driver 209 drives the main-scanning motor 105. The gap adjuster 210 instructs the platen elevation motor 121 to adjust the gap. The platen elevation motor 121 elevates the platen 2. The sub-scanning motor driver 211 serves to drive the sub-scanning motor 111 that drives the timing belt 114. The I/O unit 207 inputs, to the controller 200, detection pulses from the linear encoder 120 and the encoder wheel 115 and detection signals from other various types of sensors.

This controller 200 receives print data or the like by the host I/F 201 via a cable or a network, and temporarily stores the print data or the like in a reception buffer. The printer driver 31 generates print data in an information processing apparatus such as a personal computer (PC), an image reading device such as an image scanner, and a host device such as an imager (e.g., a digital camera). The CPU 202 of the controller 200 reads out print data from the reception buffer in the host I/F 201 and analyzes the print data.

Alternatively, the controller 200 may read, acquire, and analyze stored print data in response to an insertion of an external storage medium 9, such as a universal serial bus (USB) memory or a secure digital (SD) card, into a medium IN 213 (memory insertion port).

In accordance with the analysis result of the stored print data, the ASIC 206 performs desired image processing, sorting process of data, and the like, and transfers a result to the print controller 208. Therefore, the print controller 208 outputs image data and a drive waveform to the head driver 130 at a predetermined timing. The print controller 208 may store font data to the ROM203 to generate dot pattern data for image output. The printer driver 31 may develop the image data into bitmap data and transfer to the printer 1 (apparatus). The printer driver 31 is a controller of the host device 30 side. Here, it is assumed that the printer driver 31 performs the above processes, for example.

The print controller 208 includes a drive waveform generator including a digital-to-analog (D/A) converter, a voltage amplifier, a current amplifier, and the like. The D/A converter converts the pattern data of the drive pulse stored in the ROM 203 and read by the CPU 202 from a digital signal to an analog signal. The drive waveform generator of the print controller 208 outputs a drive waveform including one drive pulse or multiple drive pulses to the head driver 130.

The head driver 130 drives the head 180 based on the image data (dot pattern data) corresponding to one line printed by the head 180 serially input to the head 180. The head driver 130 selectively applies drive pulses to the pressure generator of the head 180. The drive pulses include the drive waveform provided from the drive waveform generator of the print controller 208.

The head driver 130 includes, for example, a shift register to which a clock signal and serial data as image data are input, and a latch circuit that latches a resist value of the shift register by a latch signal. In addition, the head driver 130 includes a level conversion circuit (level shifter) that changes the level of the output value of the latch circuit, an analog switch array (switch unit) that is controlled to be turned on or turned off by the level shifter, and the like. Functionally, the head driver 130 controls turning ON or turning OFF of the analog switch array to selectively apply a desired drive pulse in the drive waveform to the pressure generator of the head 180, for example.

The registration sensor 123 mounted (held) on the carriage 100 performs sensing of the fabric C. Then, a presence or an absence of the fabric C in the width direction in the carriage 100 is detected to be used to determine a position of the ink discharge position of the head 180 in the width direction.

The gap adjuster 210 drives the platen elevation motor 121. to move the platen 2 upward or downward.

The LED driver 212 drives the light emitting element 3 configured by a light emitting diode (LED) to emit light. The light emitting element 3 and the light receiving element 4 function as a height detector 140 (detector).

The cartridge attachment detection circuit 541 is a circuit to determine whether the head 180 is attached to or detached from the carriage 100. In FIG. 3, the cartridge attachment detection circuit 541 is illustrated at a position away from the carriage 100. However, the cartridge attachment detection circuit 541 is attached to the carriage 100 and detects that the head 180 is attached to (mounted on) the carriage 100.

In a case in which the head 180 is separated from the liquid cartridge 190, the cartridge attachment detection circuit 541 is provided to a cartridge holder (cartridge mount) to which the liquid cartridge is detachably attached. The liquid cartridge 190 supplies a liquid (ink) to the head 180 via a tube or the like.

[Attachment Detection Configuration of Liquid Cartridge]

Output signals (detection signals) of the cartridge attachment detection circuit 541 are input to the CPU202. The CPU202 develops a control program stored in the ROM203 in a storage area of the RAM204 and executes a control process based on output signals of the cartridge attachment detection circuit 541. When the output signal is detected in a process of the control program of the CPU 202, the liquid cartridge 190 is in a state in which the liquid cartridge 190 is detached from the carriage 100 or cartridge holder. That is, the liquid cartridge 190 is in a "detached (unmounted) state".

Conversely, when the output signal is not detected by the control program of the CPU 202, the liquid cartridge 190 is in a state of being attached to the carriage 100 or the cartridge holder. That is, the liquid cartridge 190 is in an "attached state (mounted state)". Therefore, in the control program of the CPU 202, the attachment state information indicating an attachment or a detachment of the liquid cartridge 190 to or from the carriage 100 or the cartridge holder is identified based on the output signal of the cartridge attachment detection circuit 541.

Figure 4:
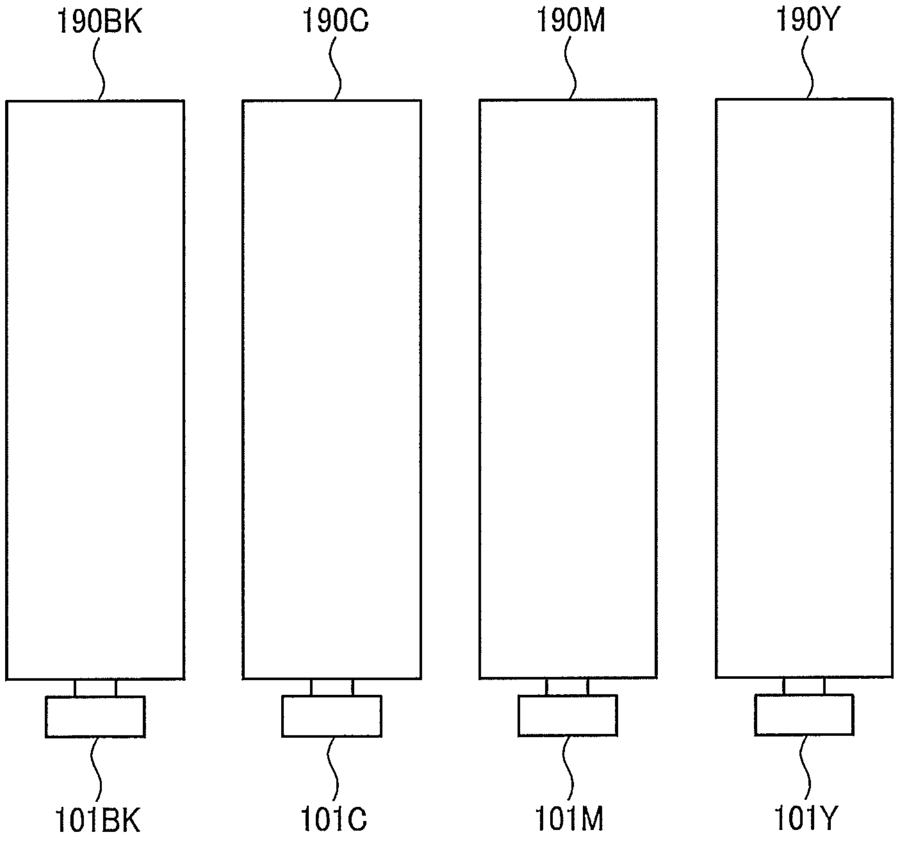
FIG. 4 is a front view of liquid cartridges illustrating a state in which the liquid cartridges are attached to a carriage.

FIG. 4 is a front view of the heads 180 and the liquid cartridges 190 illustrating a state in which the heads 180 are attached to the liquid cartridges 190. In FIG. 4, four heads 180 are respectively attached to four liquid cartridges 190 (190BK, 190C, 190M, and 190Y). Note that BK corresponds to black liquid ink, C corresponds to cyan liquid ink, M corresponds to magenta liquid ink, and Y corresponds to yellow liquid ink. FIG. 4 is a front view of the printer 1 illustrating a state in which the liquid cartridge 190 is attached to the carriage 100 or the cartridge holder as the holder (mount).

The carriage 100 as the holder includes detection switches 101 (101BK, 101C, 101M, 101Y) serving as detectors on the carriage 100 serving as a holder. The detection switch 101 is a switch to cut off current or allows the current to pass through the switch. In a state in which the liquid cartridges 190 (190BK, 190C, 190M, 190Y) are attached to (mounted on) the carriage 100 (printer 1), each of the detection switch 101 (101BK, 101C, 101M, 101Y) is in a pressed state.

Figure 5:
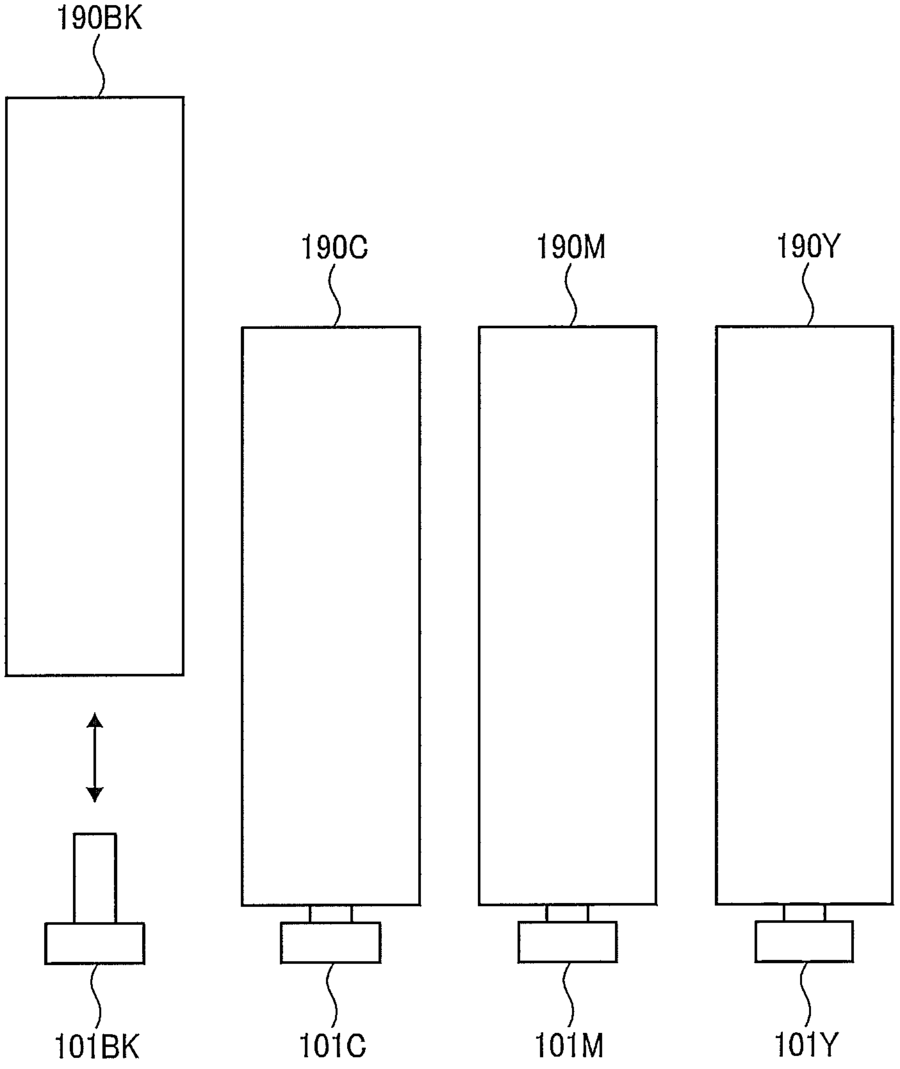
FIG. 5 is a front view of the liquid cartridge illustrating a state in which the liquid cartridge is detached from the carriage.

FIG. 5 is a front view of the heads 180 and the liquid cartridges 190 illustrating a state in which the liquid cartridge 190BK is detached from the carriage 100. In this state in which the liquid cartridge 190BK is detached from the carriage 100, the detection switch 101BK is opened. The detection switches 101C, 101M, and 101Y have the same circuit configuration with the detection switch 101BK. In a circuit configuration according to the first embodiment, the output signals indicating a pressed state or an opened state of the detection switches 101 (101BK, 101C, 101M, 101Y) are independent of each other. Therefore, the detection switches 101 (101BK, 101C, 101M, 101Y) can independently and respectively detect an attachment state of the liquid cartridges 190 (190BK, 190C, 190M, 190Y).

Thus, the head 180 includes multiple heads 180, the liquid cartridge 190 includes multiple liquid cartridges 190 respectively supply liquids to the multiple heads 180, and the carriage 100 (holder) outputs to the controller 200 (circuitry) an attachment or a detachment of each of the multiple liquid cartridges 190 to or from the carriage 100 (holder). That is, the multiple liquid cartridges 190 are configured to store respective liquids to be discharged from the respective multiple heads 180.

Figure 6:
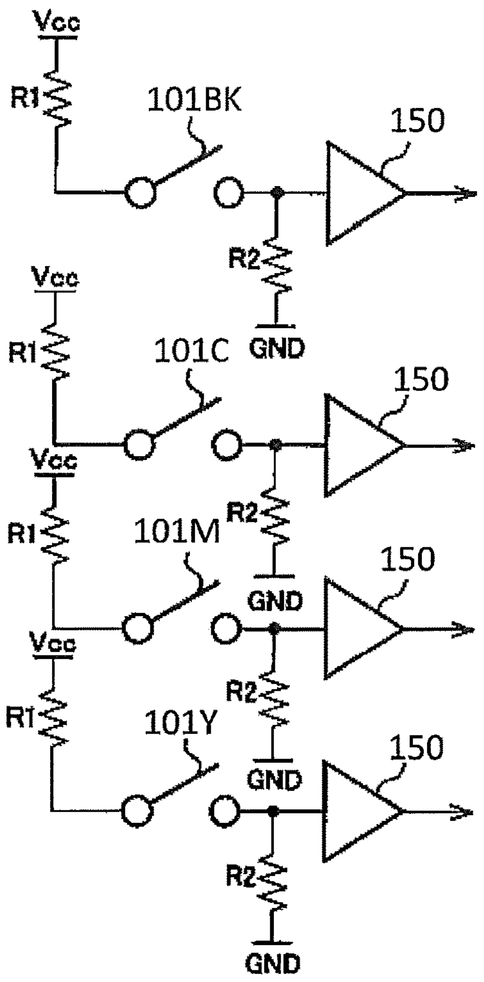
FIG. 6 is a circuit diagram of a cartridge attachment detection circuit that detects an attachment or a detachment of the liquid cartridge to or from the carriage or a cartridge holder.

FIG. 6 is a circuit diagram of a cartridge attachment detection circuit 541 that detects an attachment or a detachment of the liquid cartridge 190 to or from the carriage 100 or the cartridge holder. Each of one end (left end in FIG. 6) of the detection switch 101 (101BK, 101C, 101M, 101Y) is connected to Vcc via a resistor R1. Each of another end (right end in FIG. 6) of the detection switch 101 (101BK, 101C, 101M, 101Y) is connected to GND via a resistor R2. The detection switch 101 (101BK, 101C, 101M, 101Y) is set to 5 V or 3.3 V, for example. Each of another end (right end in FIG. 6) of the detection switch 101 (101BK, 101C, 101M, 101Y) serves as an output of the cartridge attachment detection circuit 541 via the driver element 150.

When the detection switches 101 (101BK, 101C, 101M, 101Y) are in a pressed (closed) state, the output signals of the cartridge attachment detection circuit 541 are obtained as voltage outputs at a constant level of, for example, about 2.5 V. In a state in which the detection switches 101 (101BK, 101C, 101M, 101Y) are opened, the output signal is obtained as a voltage output at a ground level.

Figure 7:
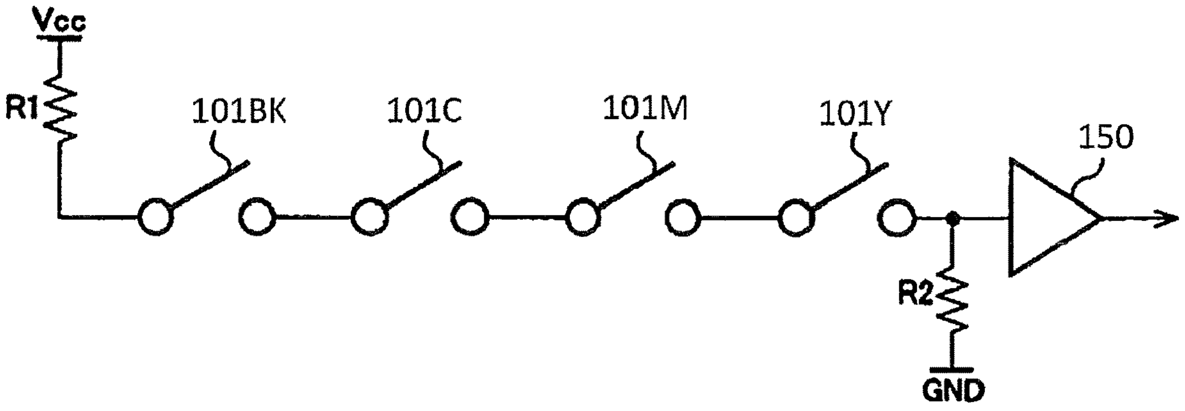
FIG. 7 illustrates another example of a circuit diagram of the cartridge attachment detection circuit to detect attachment of the liquid cartridge.

FIG. 7 illustrates another example of a circuit diagram of the cartridge attachment detection circuit 541 to detect attachment of the liquid cartridge 190. In this circuit, each of the detection switches 101 (101BK, 101C, 101M, 101Y) are connected in series. One end of the detection switches 101 is connected to Vcc via the resistor R1, and another end of the detection switches 101 is connected to GND via a resistor R2. The driver element 150 is also connected to another end of the detection switches 101. Another end of the detection switches 101 becomes the output of the cartridge attachment detection circuit 541 via this driver element 150.

When the detection switches 101 (101BK, 101C, 101M, 101Y) are in a pressed (closed) state, the output signals of the cartridge attachment detection circuit 541 are obtained as voltage outputs at a constant level of, for example, about 2.5 V. In a state in which at least one of the detection switches 101 (101BK, 101C, 101M, 101Y) is opened, the output signal is obtained as a voltage output at a ground level.

Therefore, the detection switches 101 (101BK, 101C, 101M, 101Y) having the circuit configuration illustrated in FIG. 7 cannot independently and respectively detect the attachment state of the liquid cartridges 190 in FIG. 4. The detection switches 101 (101BK, 101C, 101M, 101Y) having the circuit configuration illustrated in FIG. 7 may detect whether all the liquid cartridges 190 are attached (mounted) or at least one of the liquid cartridges 190 is detached (removed).

First Embodiment

Next, a first embodiment of a control program executable by the controller 200 of the printer 1 is described below with reference to flowcharts of FIGS. 8 and 9. This printer 1 according to the first embodiment also corresponds to a liquid discharge method according to the first embodiment that can be executed by the printer 1.

For example, when an image is formed on a medium (fabric G) such as a garment, and a certain period of time elapses while the liquid cartridge 190 is attached to the printer 1, a part of content components of the liquid ink may be precipitated to become a factor of lowering the discharging performance of the head 180. If the liquid discharge operation is executed while there is precipitation of the part of content components of the liquid ink, the color density of the liquid ink adhered to the fabric G may become uneven, and the quality of the formed image may be deteriorated. Further, the precipitation may cause clogging of the nozzles of the head 180. The clogging of nozzles may prevent the printer 1 from normally preforming the liquid discharge operation.

To prevent precipitation of the liquid ink, it is effective to periodically remove the liquid cartridge 190 from the carriage 100 and execute an operation (stirring operation) of stirring the color component precipitated in the liquid ink stored in the liquid cartridge 190 over a certain period of time. Such a stirring operation can uniformize the color components precipitated in the liquid cartridge 190 so that the above-described factors that prevent normal operation of the printer 1 can be eliminated.

Therefore, the printer 1 uses the control program executable in the CPU202 in the controller 200 to monitor a timing good for performing the stirring operation of the liquid cartridge 190, and performs a stopping process to stop the operation of the printer 1 for the stirring operation. Further, the printer 1 resumes the operation when the stirring operation is executed for a certain period of time to obtain the effect of the stirring operation. The control program displays, on the operation panel 6, an operation instruction to urge the operator to execute the stirring operation for the corresponding liquid cartridge 190 when the control program detects the liquid cartridge 190, which has been attached to the carriage 100 for a given period of time.

Figure 8:
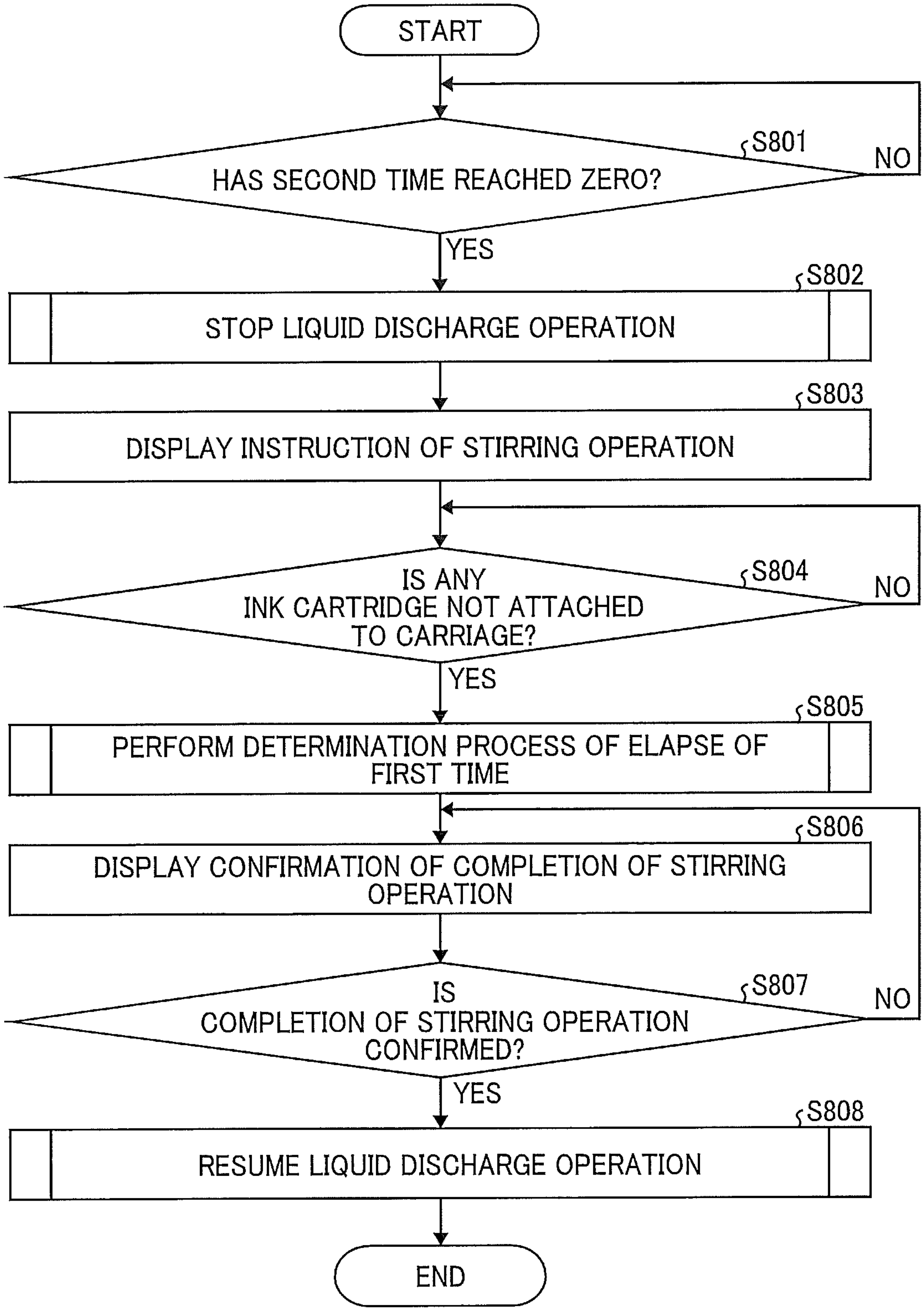
FIG. 8 is a flowchart illustrating a flow of the control process according to the first embodiment.

FIG. 8 is a flowchart illustrating a flow of the control process according to the first embodiment. First, the controller 200 determines whether a second time previously set as an effective interval for performing the stirring operation on the liquid cartridge 190 has reached zero in step S801. Hereinafter, the step S801 is simply referred to as "S801", and other steps are also similarly referred below. The second time is a time measured by a second timer controlled by the controller 200. If the second timer is a countdown timer, the controller 200 determines whether a remaining time has reached zero as illustrated in S801.

The second time is, for example, 12 hours. This 12 hours corresponds to a cycle in which maintenance (stirring) for maintaining quality of a liquid discharge state is executed. Note that the second time is not limited to 12 hours and can be appropriately changed and set. Further, the second time may be an elapsed time from a resumption of the operation of the printer 1 instead of the countdown timer. In the above case, the controller 200 determines the step S801 based on whether the elapsed time has exceeded 12 hours.

The controller 200 loops the above process until the second time has reached zero (S801: NO). When the second time has reached zero (S801: YES), the controller 200 stops the operation of the printer 1 such as the liquid discharge operation, for example (S802).

Figure 10:
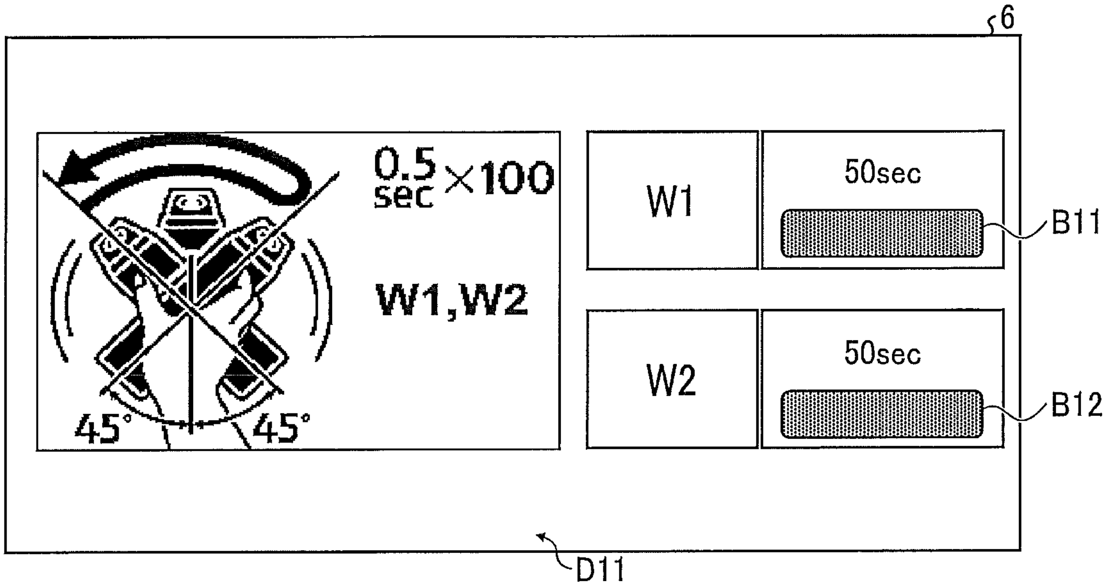
FIG. 10 is a schematic view of a display illustrating an example of an operation instruction according to the first embodiment.

Subsequently, the controller 200 displays, on the operation panel 6, an operation instruction as illustrated in FIG. 10 (S803).

FIG. 10 is a schematic view of a display illustrating an example of an instruction display for instructing the operator to perform the stirring operation. The stirring operation stirs the content components in the liquid ink in the liquid cartridge 190 by shaking the liquid cartridge 190.

A first instruction display D11 illustrated in FIG. 10 displays a diagram schematically illustrating a state of the stirring operation to stir the content components in the liquid cartridge 190. This schematic diagram in the first instruction display D11 illustrates a reciprocal operation to shake the liquid cartridge 190. The reciprocal operation repeats tilting the liquid cartridge 190 right and left by 45 degrees with respect to the vertical direction in a cycle of 0.5 seconds. The first instruction display D11A displays that a number of repetition of the reciprocal operation is one hundred times as indicated by "0.5 sec×100".

Further, the first instruction display D11 displays a diagram illustrating that there are two liquid cartridges 190 (W1 and W2) corresponding to targets for monitoring a performance cycle of the stirring operation as illustrated in FIG. 10. Further, the first instruction display D11 displays a number indicating the first time as an individual stirring operation time corresponding to each liquid cartridge 190 (W1 and W2).

Further, as illustrated in FIG. 10, the first instruction display D11 includes a button B11 and a button B12 corresponding to an operation image for instructing the operator to start measuring the first time corresponding to the elapsed time of the stirring operation executed for each liquid cartridge 190 (W1 and W2).

Referring back to FIG. 8, a description is further given. The controller 200 determines whether the liquid cartridge 190 as the target of the stirring operation is detached (removed) from the carriage 100 and is not attached (S804) to the carriage 100 when the operation panel 6 displays the first instruction display D11. When the liquid cartridge 190 is detached (removed) from the carriage 100, a signal is output from the corresponding driver element 150.

As a result, the controller 200 identifies that the individual liquid cartridge 190 has been detached (removed) from the carriage 100 and has not been attached (mounted). When any one of the liquid cartridges 190 is detached from the carriage 100 and is not attached to (detached from) the carriage 100 (S804: YES), the controller 200 executes a determination process of an elapse of the first time (S805). Hereinafter, the "determination process of the elapse of the first time" is simply referred to as a "first-time determination process".

Figure 9:
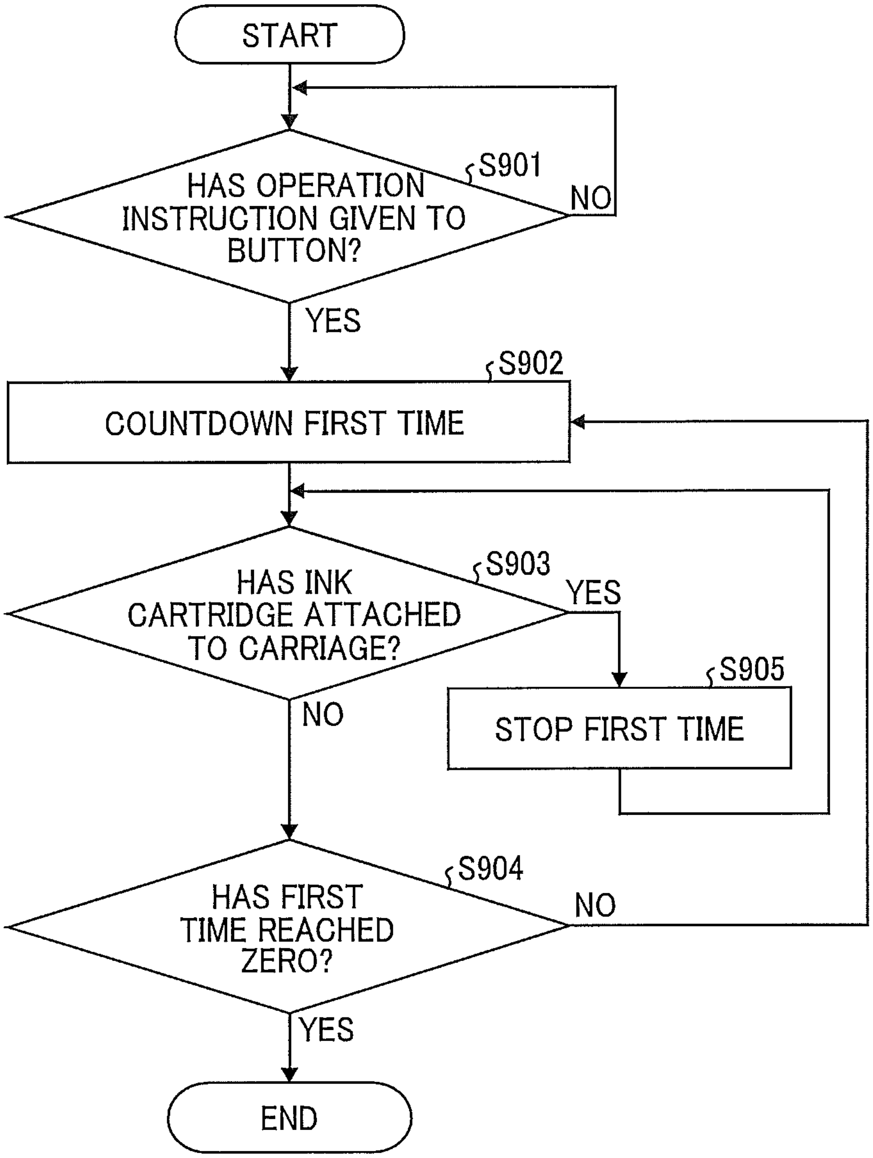
FIG. 9 is a flowchart illustrating a detailed flow of the control process.

FIG. 9 is a flowchart illustrating a flow of the first-time determination process (S805). First, when the controller 200 identifies that the liquid cartridge 190 has been detached (removed) from the carriage 100, the controller 200 displays, on the operation panel 6, the first instruction display D11 (operation instruction) as illustrated in FIG. 11.

Figure 11:
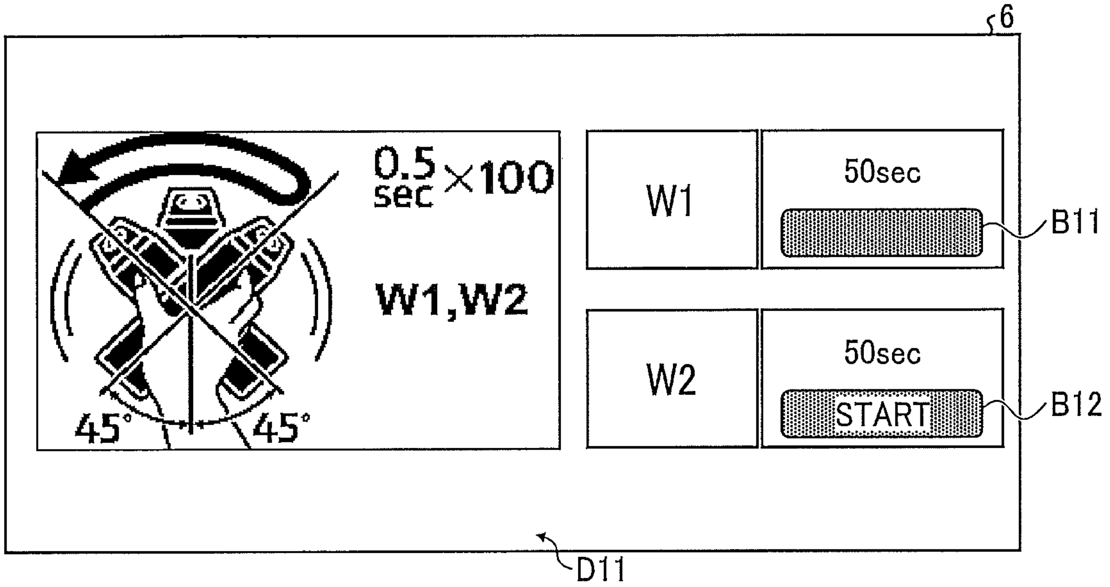
FIG. 11 is a schematic view of a display illustrating another example of an operation instruction according to the first embodiment.

FIG. 11 illustrates an example in which an operation instruction can be given to the button B12 corresponding to the liquid cartridge 190 (W2) not attached to the carriage 100. Thus, the controller 200 controls a first timer to prepare countdown of the first time in response to a detachment of the liquid cartridge 190 from the carriage 100 (holder). This preparation of the countdown includes a display of the button B12 on the control panel 6 (display). A real-time clock (RTC) in the CPU 202 may be used as the first timer and the second timer.

Referring back to FIG. 9, a description is further given. In the first-time determination process (S805), first, the controller 200 determines whether a predetermined operation instruction has been given to the button B12 displayed on the operation panel 6 (S901). The predetermined operation instruction refers to an operation for instructing the operator to start an operation of the first timer to monitor the first time, such as tapping a button B12.

Thus, the operation panel 6 (display) is configured to display a tappable button B12 as the operation instruction, detect tapping of the tappable button B12; and output to the controller 200 (circuitry) a detection of the tapping. Thus, the control panel 6 (display) is detectable an operation such as tapping performed on the button B12 (operation instruction) displayed on the control panel 6 (display).

Figure 12:
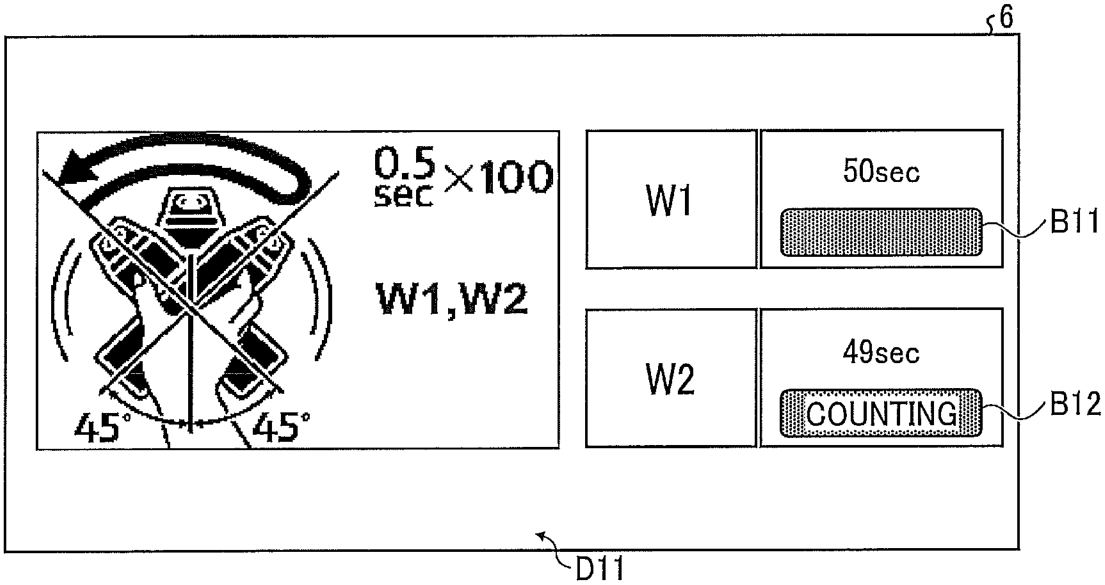
FIG. 12 is a schematic view of a display illustrating still another example of an operation instruction according to the first embodiment.

When the operation instruction is given to the button B12 in a state in which the operation instruction can be given to the button B12 (S901: YES), the controller 200 sets the first time as the stirring time of the corresponding liquid cartridge 190, and start count down (operation of) the first timer as the countdown timer (S902). Specifically, the controller 200 counts down the stirring time. At this time, the operation panel 6 displays a remaining time of the first time of the liquid cartridge 190 (W2) as indicated by "49 sec" in FIG. 12. The button B12 continues to display a notification in which an execution time of the stirring operation is being measured as indicated by "COUNTING" in FIG. 12.

The operation panel 6 (display) is configured to display an operation instruction output from the controller 200 (circuitry). Another timer configured to countdown another time (second time) from a timing of resumption of the discharge operation. The controller 200 (circuitry) is configured to control the head 180 to stop the discharge operation after another time (second time) has reached zero, and control the operation panel 6 (display) to display the operation instruction to perform the stirring operation.

Referring back to FIG. 9, a description is further given. While the first timer is operating, the controller 200 determines whether the liquid cartridge 190 has attached to and mounted on the carriage 100 (S903). When the liquid cartridge 190 that has not been attached to the carriage is not attached to the carriage 100 (S903: NO), and the first time has not reached zero (S904: NO), the controller 200 continues to countdown the first time (S902).

Figure 13:
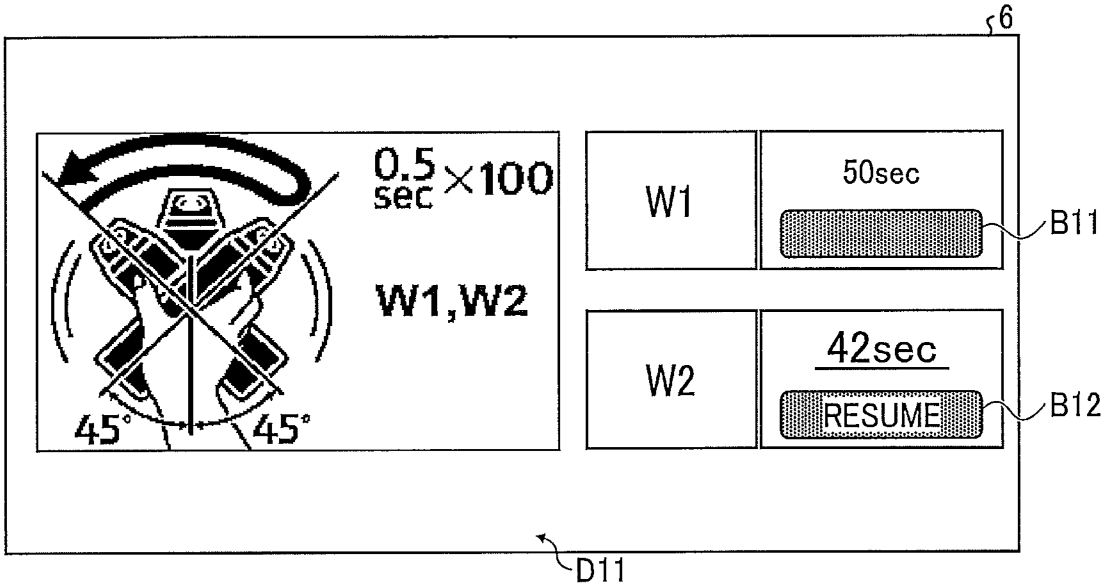
FIG. 13 is a schematic view of a display illustrating still another example of an operation instruction according to the first embodiment.
Figure 14:
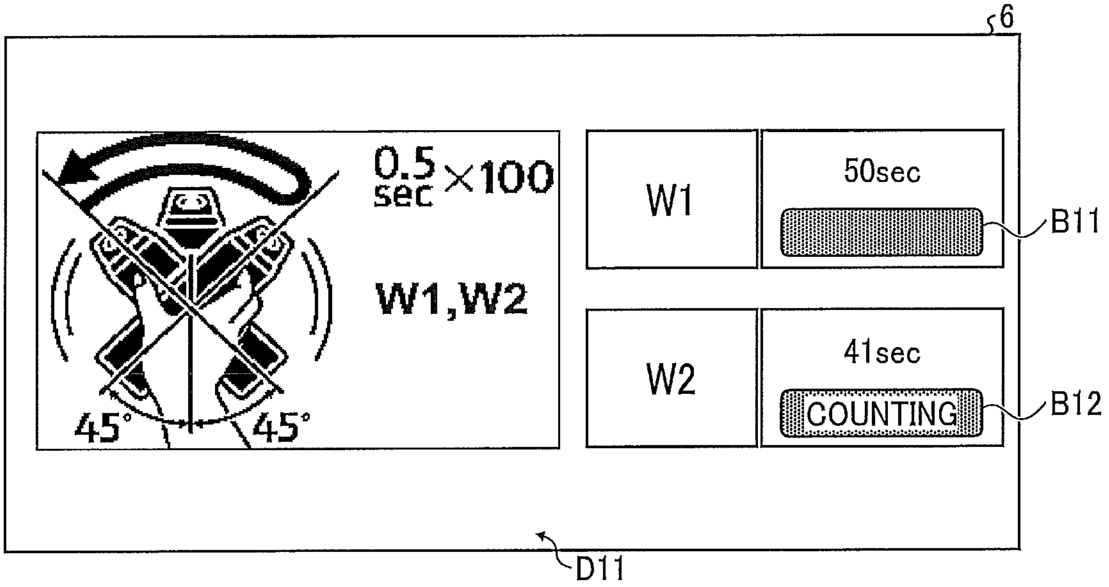
FIG. 14 is a schematic view of a display illustrating still another example of an operation instruction according to the first embodiment.

When the liquid cartridge 190 that has not been attached to the carriage 100 is attached to the carriage 100 in S903 (S903: YES), the controller 200 stops the operation of the first timer and stops the countdown of the first time (S905). At this time, the controller 200 displays the first instruction display D11 illustrated in FIG. 13 on the operation panel 6. Then, when the liquid cartridge 190 is detached and returned to the detached state (S903 again: NO), the controller 200 display, on the operation panel 6, a display indicating that the countdown has been resumed as in the first instruction display D11 illustrated in FIG. 14.

The controller 200 (circuitry) is further configured to temporally stop the countdown of the first time in response to an attachment of the liquid cartridge 190 to the carriage 100 (holder) before first time has reached zero, and resume the countdown of the first time in response to a detachment of the liquid cartridge 190 from the carriage 100 (holder) again before the first time has reached zero.

Then, the controller 200 determines whether the first time has reached zero (S904), and the controller 200 repeats the processes after the step S902 (S904: NO) until the first time has reached zero, that is, until the first time has reached.

When the first time has reached zero (S904: YES), the controller 200 displays, on the operation panel 6, a completion display of the stirring operation on an assumption that the stirring operation is continuously performed until the first time passes. The first time is set as the time for performing the effective stirring operation.

Figure 15:
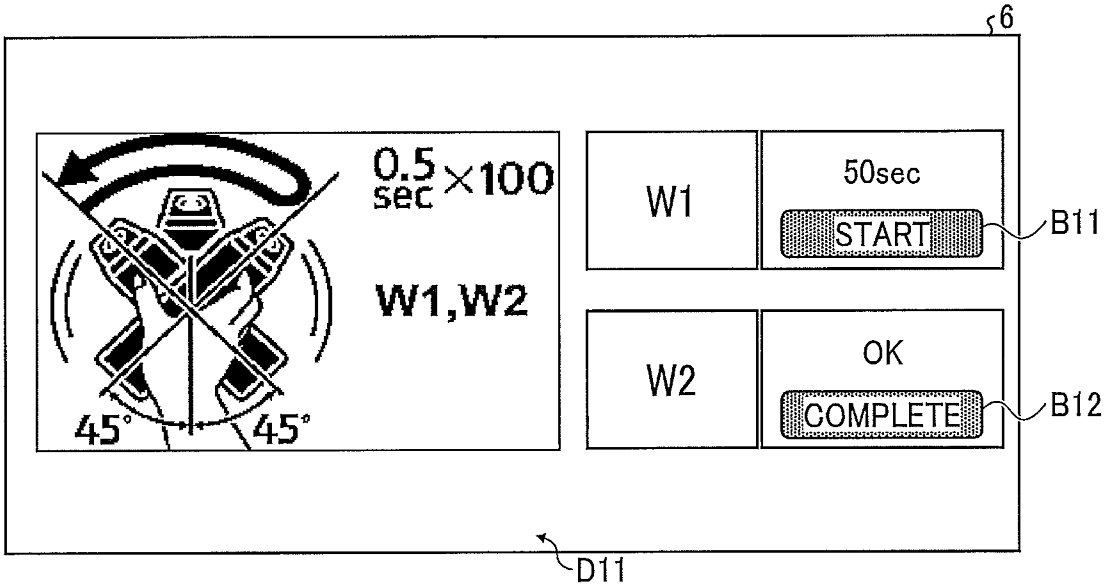
FIG. 15 is a schematic view of a display illustrating still another example of an operation instruction according to the first embodiment.

FIG. 15 illustrates an example of the first instruction display D11 as the completion display. As illustrated in FIG. 15, the controller 200 displays information indicating completion of the stirring operation on the button B12 and characters "OK" above the button B12, so that the operator can recognize that the stirring operation has been normally completed. Subsequently, when another liquid cartridge 190 (W1) is detached from the carriage 100, the controller 200 performs the processes after the step S804 similarly to the above-described processes, and the controller 200 executes a series of processes to ensure the effectiveness of the stirring operation of the liquid cartridge 190 (W1).

Referring back to FIG. 8, a description is further given. After an end of the first-time determination process (S805), the controller 200 displays, on the operation panel 6, an image for confirming a completion of the stirring operation (S806).

Figure 16:
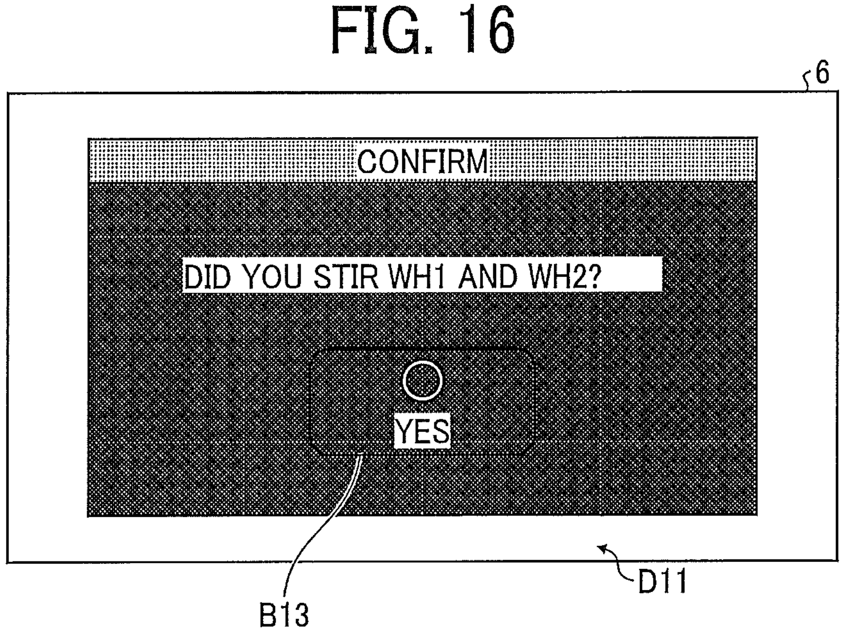
FIG. 16 is a schematic view of a display illustrating still another example of an operation instruction according to the first embodiment.

FIG. 16 illustrates an example of the first instruction display D11 including the button B13 as a confirmation screen of completion of the stirring operation. When the operator operates (taps) the button B11 in a state in which the first instruction display D11 illustrated in FIG. 16 is displayed, the completion of the stirring operation is confirmed.

Referring back to FIG. 8, a description is further given. The controller 200 continue to loop the process of the steps S806 and S807 until the operator operates (taps) the button B11 displayed in the first instruction display D11 (S807: NO). When the button B11 is operated (tapped), the completion of the stirring operation is confirmed (S807: YES). Then, the controller 200 releases stopping of the liquid discharging operation (S808), that is, resumes the liquid discharging operation (S808), resets the second timer, and starts count down the second time until a timing of performing the next stirring operation comes.

Thus, the controller 200 (circuitry) is configured to control the head 180 to discharge the liquid as a discharge operation, control the head 180 to stop the discharge operation, determine an attachment or a detachment of the liquid cartridge 190 to or from the carriage 100 (holder) while the discharge operation is stopped, control the first timer to prepare countdown of the first time in response to a detachment of the liquid cartridge 190 from the carriage 100 (holder), and control the head 180 to continue stopping the discharge operation in response to an attachment of the liquid cartridge 190 to the carriage 100 (holder) before the first time has reached zero.

Effects of First Embodiment

As described above, the controller 200 can control to prohibit the operator to start the liquid discharge operation unless the operator reliably performs the stirring operation to eliminate precipitation of the content components of the liquid ink that that may deteriorate the image quality in the printer 1 according to the first embodiment.

Further, the controller 200 may display an image illustrating an amount of desired stirring operation with a time and a state of operation and clearly presents a stirring procedure and an operation time to the operator, which supports the operator to reliably execute the stirring operation, to promote the effectiveness of the stirring operation.

Further, the controller 200 displays the button B11 and B12 that instructs the operator to start countdown of the stirring operation to assist the operator to clearly indicates the printer 1 that the execution of the stirring operation has started to assist the effectiveness of the stirring operation of the operator.

As a result, the printer 1 can improve a practicability of the stirring operation by the operator to improve the image quality. Thus, the printer 1 can improve effectivity of stirring operation to prevent precipitation of the content component of the liquid ink to improve quality of a liquid discharged from the head 180 according to the first embodiment of the present disclosure.

In the first embodiment, the countdown of the timer is used as a reference to monitor an execution interval of the stirring operation and an execution time of the stirring operation. However, the controller 200 may perform the process by a count-up mode in which the controller 200 measures an elapsed time of each liquid cartridge 190 and determines whether a predetermined threshold time has been exceeded (reached) for each liquid cartridge 190.

That is, it is determined whether the stirring operation has been sufficiently executed based on whether a preset time (first time) has been subtracted and reached zero in the countdown mode In the count-up mode, the controller 200 measures a time since the liquid cartridge 190 is detached from the carriage 100 as the holder and displays this time on the operation panel 6 as a display, for example. The controller 200 may stop a measurement of above-described time (elapsed time) when the liquid cartridge 190 is attached to the carriage 100 before the above-described time (elapsed time) exceeds a preset threshold time (the first time, for example).

The controller 200 may not display a time in the display of an operation instruction. The controller 200 may display a moving image to clearly display a state of the stirring operation to prompt a correct stirring operation. The controller 200 may display, on the operation panel 6, a notification that notifies the operator that a predetermined stirring operation is completed.

Thus, the printer 1 (liquid discharge apparatus) includes the head 180 configured to discharge a liquid; the liquid cartridge 190 configured to store the liquid to be discharged from the head 180; a holder (carriage 100) configured to detachably attach the liquid cartridge 190; a display (control panel 6) configured to display an operation to be performed; a first timer configured to count a time; and circuitry (controller 200) configured to: determine an attachment or a detachment of the liquid cartridge 190 to or from the holder (carriage 100); control the first timer to start counting the first time in response to a detachment of the liquid cartridge 190 from the holder (carriage 100); control the display (control panel 6) to display the first time counted by the first timer on the display (control panel 6); and control the first timer to stop counting the first time in response to an attachment of the liquid cartridge 190 to the holder (carriage 100) before the first time has reached a preset threshold time.

Second Embodiment

Next, a second embodiment of a control program executable by the controller 200 of the printer 1 is described below with reference to a flowchart of FIG. 17. The present embodiment also corresponds to a second embodiment of a liquid discharge method (liquid discharge restriction method) executable by the printer 1.

Figure 17:
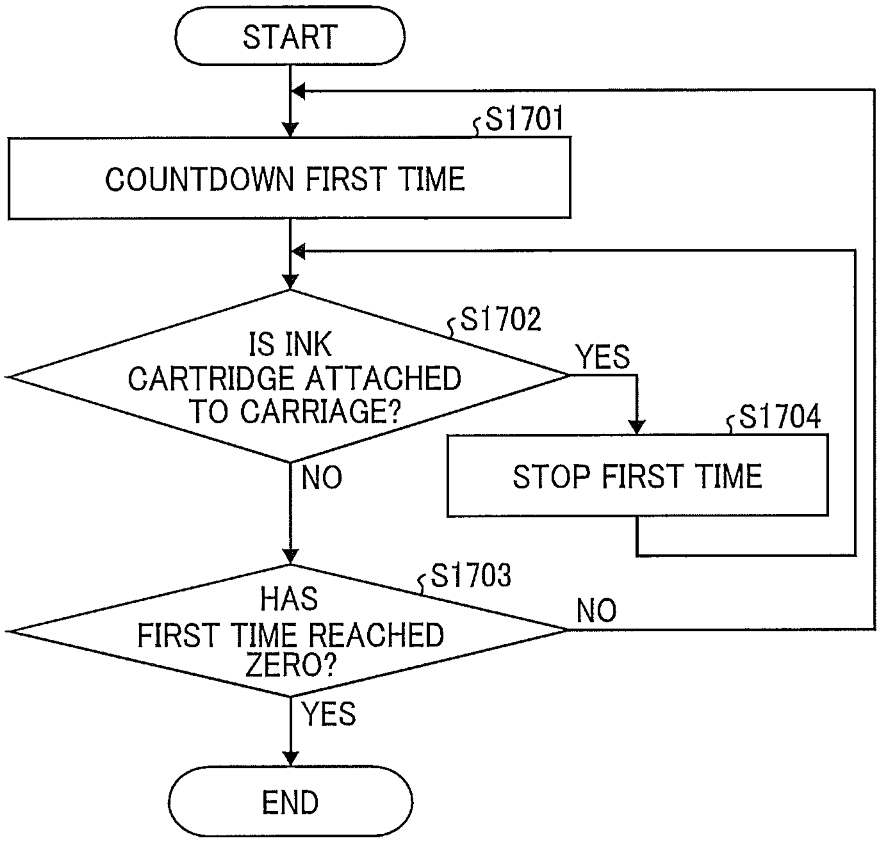
FIG. 17 is a flowchart illustrating a detailed flow of the control process according to a second embodiment of the present disclosure.

FIG. 17 is a flowchart illustrating a flow of a process of the control program according to the second embodiment. The process of the control program according to the second embodiment is partially different from the process of the control program according to the first embodiment as described above. More specifically, a portion corresponding to the first-time elapse determination process (S805) described with reference to FIG. 8 is different. Therefore, the portion of the second embodiment different from the first embodiment is described below in detail in FIG. 17.

As described above, the controller 200 identifies the attachment state of the liquid cartridge 190. When the controller 200 detects that any one of the liquid cartridges 190 has been detached (S804: YES, see FIG. 8), the controller 200 executes the first-time determination process illustrated in FIG. 17.

Figure 18:
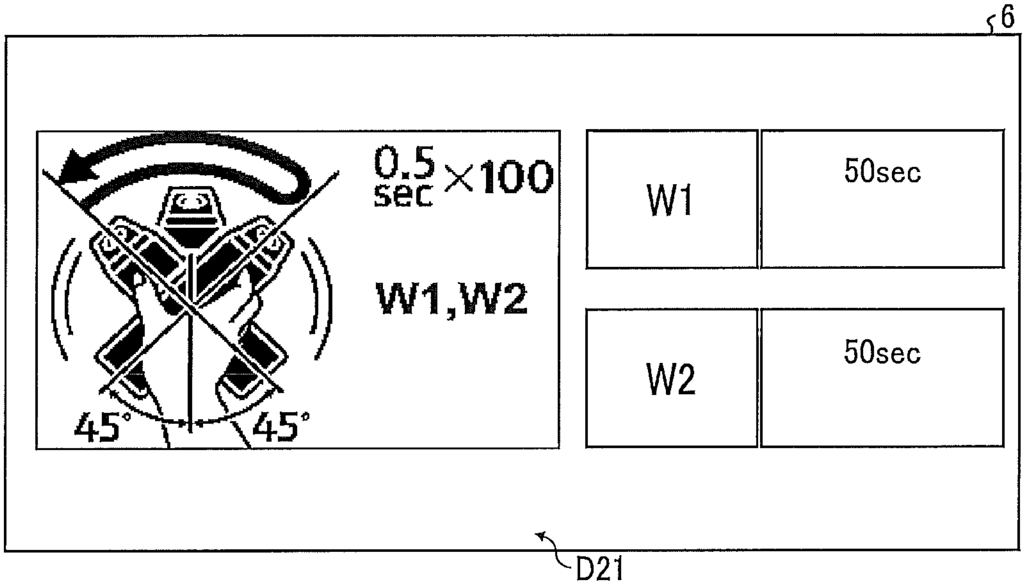
FIG. 18 is a schematic view of a display illustrating an example of an operation instruction according to the second embodiment.
Figure 19:
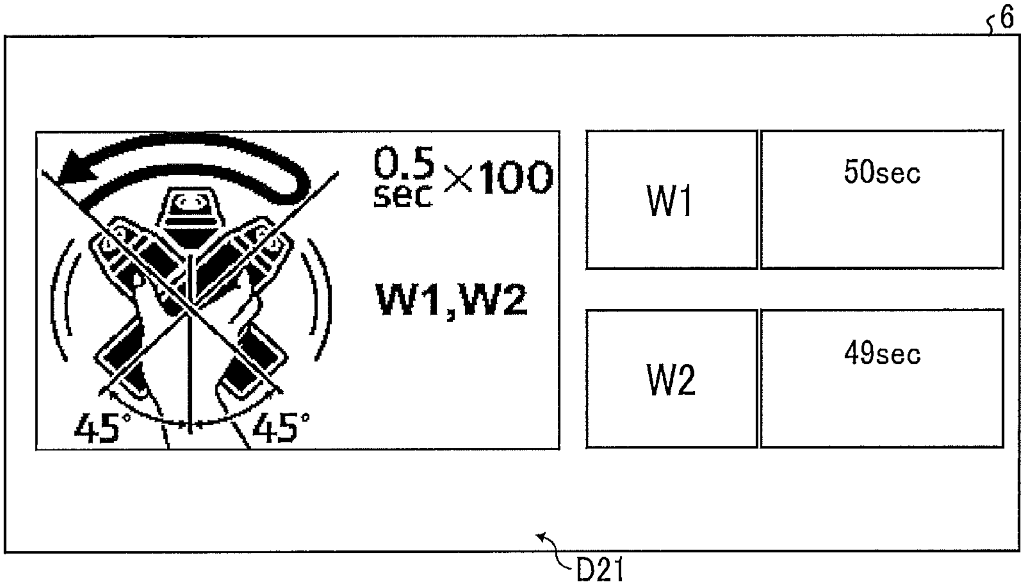
FIG. 19 is a schematic view of a display illustrating another example of an operation instruction according to the second embodiment.

First, the controller 200 starts countdown if the liquid cartridge 190 remains detached from the carriage 100 at a stage at which the operation panel 6 displays the operation display illustrated in FIG. 18 (see FIG. 19).

As illustrated in FIGS. 18 and 19, the controller 200 does not display the button B12 (see FIG. 11) corresponding to the liquid cartridge 190 that has been detached from the carriage 100 and starts the countdown at a stage in which the controller 200 detects that the liquid cartridge 200 has detached from the carriage 100 in the second embodiment.

Therefore, the controller 200 output to the operation panel 6 a display prompting the operator to perform the stirring operation at a stage in which the predetermined second time (for example, 12 hours) has reached zero. Further, the controller 200 automatically starts the countdown when the liquid cartridge 190 is detached from the carriage 100 in a state in which a series of operations related to the liquid discharge operation is stopped.

In the above case, the controller 200 controls a first timer to prepare countdown of the first time in response to a detachment of the liquid cartridge 190 from the carriage 100 (holder). This preparation of the countdown includes an activation of the first timer, for example, and other operations to automatically start countdown the first time.

Referring back to FIG. 17, a description is further given. The first time is set as the stirring time of the corresponding liquid cartridge 190, and the controller 200 starts to operate the first timer serving as the countdown timer to count down the first time (S1701). Specifically, the controller 200 counts down the stirring time. At this time, as illustrated in FIG. 19, the controller displays, on the operation panel 6, a display indicating the remaining time of the first time on the liquid cartridge 190 and continuously displays a display notifying that the execution time of the stirring operation is being measured. Note that information for the operation instruction such as the button B12 is not displayed on the operation panel 6.

Referring back to FIG. 17, a description is further given. While the first timer is operating, the controller 200 determines whether the liquid cartridge 190 is attached and mounted to the carriage 100 (S1702). When the liquid cartridge 190 that has been detached from the carriage 100 is not attached to the carriage 100 (S1702: NO) and the first time has not reached zero (S1703: YES), the controller 200 continues to countdown the first time (S1701).

Figure 20:
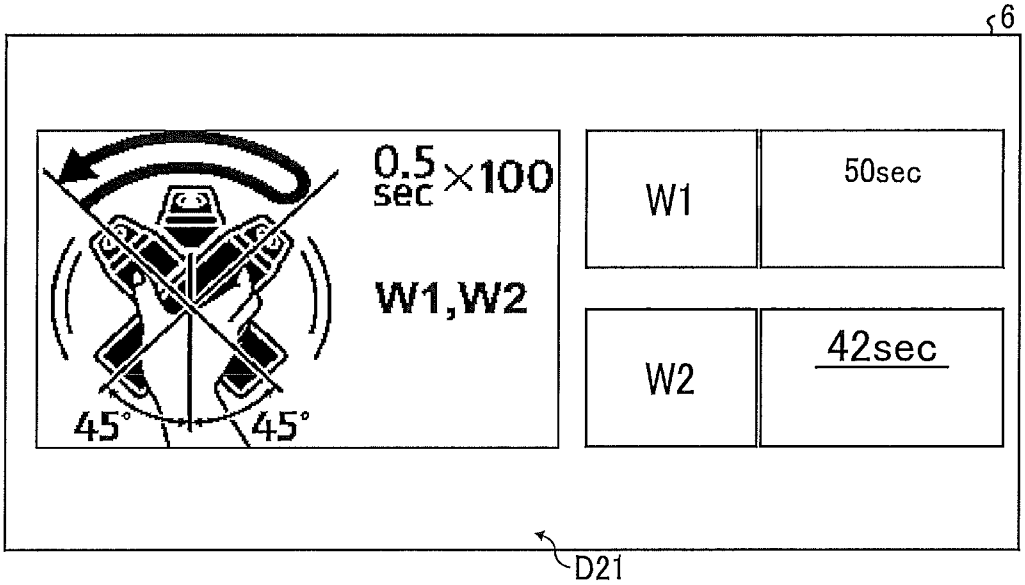
FIG. 20 is a schematic view of a display illustrating still another example of an operation instruction according to the second embodiment.
Figure 21:
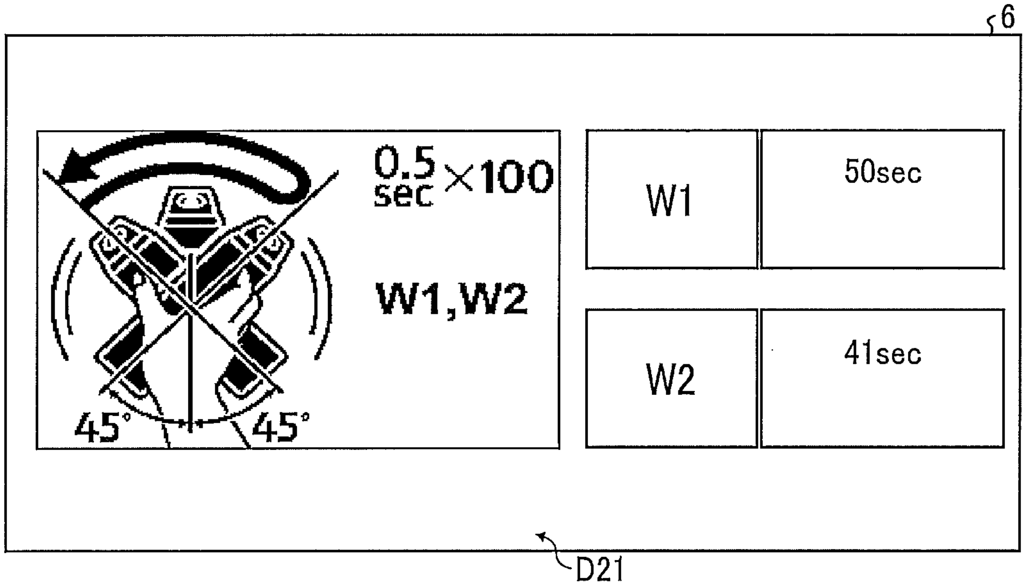
FIG. 21 is a schematic view of a display illustrating still another example of an operation instruction according to the second embodiment.

In S1702, the controller 200 stops the operation of the first timer and the countdown of the first time (S1704) when the liquid cartridge 190 that has been detached from the carriage 100 is attached to the carriage 100 (S1702: YES). At this time, the controller 200 displays, on the operation panel 6, the first instruction display D21 illustrated in FIG. 20. Then, the controller 200 displays, on the operation panel 6, a display indicating that the countdown has been resumed as in the first instruction display D21 illustrated in FIG. 21 when the liquid cartridge 190 is detached from the carriage and returned to the detached state (S1702 again: NO).

Then, the controller 200 determines whether the first time has reached zero (S1703) and repeats the processes after the step S1701 (S1703: NO) until the first time has reached zero, that is, until the first time has reached.

When the first time has reached zero (S1703: YES), the controller 200 displays, on the operation panel 6, the completion of the stirring operation on the assumption that the stirring operation is continuously performed until the first time elapse. The first time is set as the time for performing the effective stirring operation.

Figure 22:
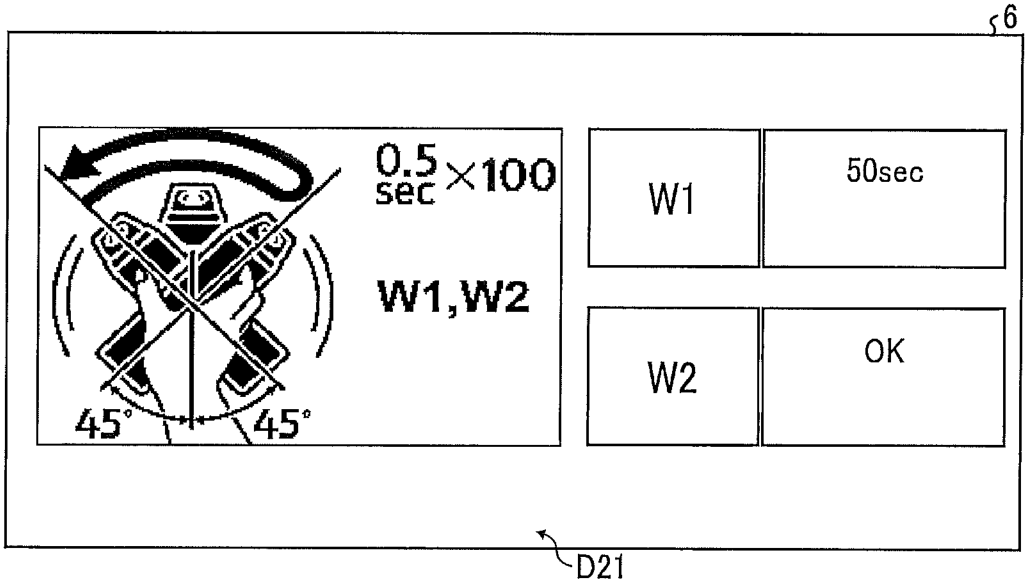
FIG. 22 is a schematic view of a display illustrating still another example of an operation instruction according to the second embodiment.

FIG. 22 illustrates an example of the first instruction display D11 as the completion display. As illustrated in FIG. 22, the controller 200 displays the characters "OK" as the information indicating the completion of the stirring operation so that the operator can recognize that the stirring operation has been normally completed. Subsequently, when another liquid cartridge 190 (W1) is detached from the carriage 100, the controller 200 performs the processes after the step S1701 similarly to the above-described processes, and the controller 200 executes a series of the processes to ensure the effectiveness of the stirring operation of the liquid cartridge 190 (W1).

As described above, the printer 1 (liquid discharge apparatus) can prompt the operator to start the stirring operation by using a detachment of the liquid cartridge 190 from the carriage 100 as a trigger and prompt the operator to reliably execute the stirring operation within a predetermined time period (first time). Thus, the printer 1 (liquid discharge apparatus) according to the second embodiment can improve the effectiveness of the stirring operation.

When the first time has reached zero (S1703: YES), the controller 200 displays, on the operation panel 6, the completion of the stirring operation on the assumption that the stirring operation has been continued until the countdown and an image that confirms the completion of the stirring operation. Then, the controller 200 performs the processes as same as the processes of steps S806 to S808.

Effects of Second Embodiment

As described above, the controller 200 can control to prohibit the operator to start the liquid discharge operation unless the operator reliably performs the stirring operation to eliminate precipitation of the content components of the liquid ink that that may deteriorate the image quality in the printer 1 according to the first embodiment.

Further, the controller 200 may display an image illustrating an amount of desired stirring operation with a time and a state of operation and clearly presents a stirring procedure and an operation time to the operator, which supports the operator to reliably execute the stirring operation, to promote the effectiveness of the stirring operation.

The controller 200 monitors the attachment state of the liquid cartridge 190 to monitor whether the stirring operation is appropriately performed. Thus, the printer 1 (liquid discharge apparatus) can support the operator to effectively perform the stirring operation without forcing the operator to perform complicated button operation.

As a result, the printer 1 (liquid discharge apparatus) can improve an executability of the stirring operation by the operator to improve quality of image formed by the printer 1.

Also in the printer 1 according to the second embodiment, the countdown of the timer is used as a reference to monitor the execution interval of the stirring operation and the execution time of the stirring operation. However, the controller 200 may perform the process by a count-up mode in which the controller 200 measures an elapsed time of each liquid cartridge 190 and determines whether a predetermined threshold time has been exceeded (reached) for each liquid cartridge 190. The controller 200 may not display, on the operation panel 6, a time in the display of the operation instruction. The controller 200 may display a moving image to clearly display a state of the stirring operation to prompt a correct stirring operation. The controller 200 may display, on the operation panel 6, a notification that notifies the operator that a predetermined stirring operation is completed.

Note that the present disclosure is not limited to specific embodiments described above, and numerous additional modifications and variations are possible in light of the teachings within the scope of the appended claims. It is to be noted that the present invention is not limited to the specific embodiments described above, and numerous additional modifications and variations are possible in light of the above teachings. It is therefore to be understood that the disclosure of this patent specification may be practiced otherwise by those skilled in the art than as specifically described herein, and such variations, modifications, alternatives are within the technical scope of the appended claims.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

Each of the functions of the described embodiments such as the controller 200 may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The above-described liquid discharge method may be stored in a non-transitory recording medium storing a plurality of instructions which, when executed by one or more processors (circuitry), cause the processors to perform the liquid discharge method.

The invention claimed is:

1. A liquid discharge apparatus comprising:

a liquid discharge head configured to discharge a liquid;

a liquid cartridge configured to store the liquid to be discharged from the liquid discharge head;

a holder to which the liquid cartridge is detachably attachable;

a timer configured to countdown a time; and circuitry configured to:

control the liquid discharge head to discharge the liquid as a discharge operation;

control the liquid discharge head to stop the discharge operation;

determine an attachment or a detachment of the liquid cartridge to or from the holder while the discharge operation is stopped;

control the timer to prepare countdown of the time in response to the detachment of the liquid cartridge from the holder; and control the liquid discharge head to continue stopping the discharge operation in response to the attachment of the liquid cartridge to the holder before the time has reached zero.

2. The liquid discharge apparatus according to claim 1, wherein the circuitry is further configured to control the liquid discharge head to resume the discharge operation in response to the attachment of the liquid cartridge to the holder after the time has reached zero.

3. The liquid discharge apparatus according to claim 2, wherein the circuitry is further configured to control the timer to:

temporally stop the countdown of the time in response to the attachment of the liquid cartridge to the holder before time has reached zero; and resume the countdown of the time in response to the detachment of the liquid cartridge from the holder before the time has reached zero.

4. The liquid discharge apparatus according to claim 2, further comprising:

a display configured to display an operation instruction output from the circuitry, and another timer configured to countdown another time from a timing of resumption of the discharge operation, wherein the circuitry is further configured to:

control the liquid discharge head to stop the discharge operation after said another time has reached zero, and control the display to display the operation instruction.

5. The liquid discharge apparatus according to claim 1, further comprising:

a display configured to display an operation instruction output from the circuitry and the time counted down by the timer.

6. The liquid discharge apparatus according to claim 5, wherein the display is further configured to detect an operation performed on the display according to the operation instruction displayed, and the circuitry is further configured to:

control the display to display the operation instruction to start countdown of the time in response to the detachment of the liquid cartridge from the holder; and control the timer to start countdown of the time in response to a detection of the operation by the display.

7. The liquid discharge apparatus according to claim 6, wherein the display is configured to:

display a tappable button as the operation instruction;

detect tapping of the tappable button; and output to the circuitry a detection of the tapping.

* * * * *